United States Patent [19]

Uehara et al.

[11] Patent Number: 5,726,722
[45] Date of Patent: Mar. 10, 1998

[54] LIGHT SOURCE FOR DISPLAY DEVICE

[75] Inventors: Makoto Uehara, Zama; Shigeki Yabu, Machida; Yoshihiro Onitsuka, Hiratsuka, all of Japan

[73] Assignee: Canon Kabushiki Kaisha, Tokyo, Japan

[21] Appl. No.: 684,727

[22] Filed: Jul. 22, 1996

Related U.S. Application Data

[63] Continuation of Ser. No. 183,308, Jan. 19, 1994, abandoned.

[30] Foreign Application Priority Data

Jan. 19, 1993 [JP] Japan .................. 5-023608
Oct. 13, 1993 [JP] Japan .................. 5-280435

[51] Int. Cl.⁶ .................. G02F 1/1335; F21S 3/00; B60Q 1/06
[52] U.S. Cl. .................. 349/66; 349/64; 362/218; 362/373; 362/225
[58] Field of Search .................. 359/48, 49, 83; 362/218, 373, 294, 30, 260, 225; 349/61, 62, 64, 65, 66

[56] References Cited

U.S. PATENT DOCUMENTS

| | | | |
|---|---|---|---|
| 3,090,434 | 5/1963 | Benson, Jr. | 362/218 |
| 3,215,828 | 11/1965 | Bonvallet | 362/218 |
| 4,660,561 | 4/1987 | Nielsen | 362/218 |
| 4,683,887 | 8/1987 | Kramer | 362/218 |
| 4,962,376 | 10/1990 | Inoue et al. | 340/784 |
| 5,046,826 | 9/1991 | Iwamoto et al. | 359/49 |
| 5,066,945 | 11/1991 | Kanno et al. | 340/784 |
| 5,099,403 | 3/1992 | Turner | 362/294 |
| 5,150,231 | 9/1992 | Iwamoto et al. | 359/44 |
| 5,335,100 | 8/1994 | Obata | 359/49 |

FOREIGN PATENT DOCUMENTS

| | | | |
|---|---|---|---|
| 159129 | 9/1984 | Japan | 359/49 |
| 588175 | 4/1993 | Japan . | |
| 5257142 | 10/1993 | Japan | 359/49 |

*Primary Examiner*—William L. Sikes
*Assistant Examiner*—Tiep H. Nguyen
*Attorney, Agent, or Firm*—Fitzpatrick, Cella, Harper & Scinto

[57] ABSTRACT

A rear right source device having a lamp chamber in which straight-tube light source lamps are arranged in the vertical direction. The light source device includes a ventilating hole formed on the upper lateral face of the lamp chamber for releasing the air of the lamp chamber heated by the light source lamps to the extrior, and a seal member mounted on the lower lateral face of the lamp chamber and substantially closing the gap between the lamp and an aperture for inserting the lamp.

52 Claims, 9 Drawing Sheets

LIGHT SOURCE FOR DISPLAY DEVICE

This application is a continuation of application Ser. No. 08/183,308 filed Jan. 19, 1994, now abandoned.

BACKGROUND OF THE INVENTION

1. Field of the Invention

The present invention relates to the structure of a rear light source adapted for use in a display device such as a projector or a liquid crystal display device.

2. Related Background Art

In a projector or a liquid crystal display device for projecting an image onto a screen, there is adopted a structure having a light source behind an optical shutter.

Particularly in a liquid crystal optical shutter, which does not emit light, there is desired a rear light source device for uniformly illuminating the display plane from the rear, in order to improve the visibility and to enable use in a dark place.

For such rear light source there have been proposed various devices of edge light type and direct illumination type employing various light sources, but, with the recent increase in size of the liquid crystal display device, there are widely used rear light sources of direct illumination type employing fluorescent lamps as the light source.

The present inventors prepared as, a test sample, a vertically oblong large-sized liquid crystal display device, which employed, as shown in FIG. 1A, a rear light source device Bk' of direct illumination type having four straight-tube fluorescent lamps 1 of a small diameter arranged in vertical position, and a desired luminance was obtained with a limited number of lamps by the use of the long fluorescent lamps 1. Said rear light source device Bk' was provided with a frame member 3 of a plastic material, which had a reflector portion 3a accommodating the fluorescent lamps 1 and reflecting the light therefrom, and a mounting portion 3b for mounting said rear light source device Bk' to a liquid crystal display panel (not shown). The reflector portion 3a of said frame member 3 was closed by a lighting curtain and a diffusing plate to constitute a lamp chamber accommodating said fluorescent lamps 1, and the upper and lower lateral faces $3a_1$, $3a_2$ thereof were provided with U-shaped notches 5a, 5b as shown in FIG. 1B and FIG. 1C, in which the fluorescent lamps 1 passed through.

In such rear light source device Bk', the air heated by the fluorescent lamps 1 moved within the lamp chamber D and was accumulated in an upper portion thereof, thus generating temperature distribution in the vertical direction within said lamp chamber D and locally elevating the temperature of the adjacent liquid crystal display panel. Such temperature distribution was more conspicuous, in the vertically oblong large-size liquid crystal display device as explained above, as the vertical length became larger. Also when the fluorescent lamps 1 were arranged in the vertical direction as in the above-explained conventional example, the temperature difference was conspicuous since vertical air paths were formed by the fluorescent lamps 1 in the lamp chamber D and the air heated by said fluorescent lamps 1 moved easily upwards along said air paths. Since the heated liquid crystal varies the phase state and electric properties thereof, the above-mentioned phenomenon results in drawbacks that the range of utilization of the liquid crystal display device becomes limited and that the information display becomes impossible depending on the temperature distribution if it is significant.

In particular, when the ferroelectric liquid crystal (FLC) consisting of the chiral smectic liquid crystal phase SmC* is used in the surface stabilized ferroelectric crystal (SSFLC) mode, the above-mentioned temperature distribution strongly affects the properties of the liquid crystal, since the temperature tolerance of the liquid crystal of this type is originally narrow.

For compensating the temperature dependence specific to the liquid crystal, there can be conceived a method of modulating the drive signal according to the temperature condition or a method for effecting uniform heating with a planar heater, but it is necessary to compensate the uneven temperature distribution inexpensively without such additional means.

Also the notches 5a, 5b formed in said frame member 3 tend to cause suction of a large amount of external air into the lamp chamber D, as a result of air convection therein, and dust sucked with said external air is deposited on said reflector portion 3, thereby deteriorating the reflective power of the reflector 3 with the lapse of time. Also, since such dust deposition occurs more significantly in the vicinity of the notches 5a, 5b, the reflective ability of the reflector 3 becomes uneven, thereby generating unevenness in the luminance of the liquid crystal display device.

SUMMARY OF THE INVENTION

An object of the present invention is to provide a rear light source for a display device, capable of suppressing the formation of uneven temperature distribution.

Another object of the present invention is to provide a rear light source for the display device, capable of providing a uniform illumination intensity distribution in the display frame.

Still another object of the present invention is to provide a rear light source for the display device, capable of preventing entry of dust into the lamp chamber.

The above-mentioned objects can be attained, according to the present invention, by a rear light source device having a lamp chamber in which a light source lamp is provided in vertical direction, comprising:

a ventilation hole formed on an upper lateral face of said lamp chamber for releasing the air of said lamp chamber, heated by said light source lamp, to the exterior; and a seal member mounted on a lower lateral face of said lamp chamber and substantially closing the gap between said light source lamp and a hole for inserting said light source lamp.

According to the present invention, there is also provided a rear light source device having a lamp chamber in which a straight-tube light source lamp is provided in the lateral direction, comprising:

a ventilation hole formed on an upper lateral face of said lamp chamber, for releasing the air of said lamp chamber, heated by said light source lamp, to the exterior.

The present invention provides a uniform temperature profile, thereby preventing local heating of the optical shutter to a high temperature. It also suppresses the entry of dust into the lamp chamber, thereby eliminating the cause of unnecessary interception of the illuminating light.

DETAILED DESCRIPTION OF THE PREFERRED EMBODIMENTS

Figure 1A:
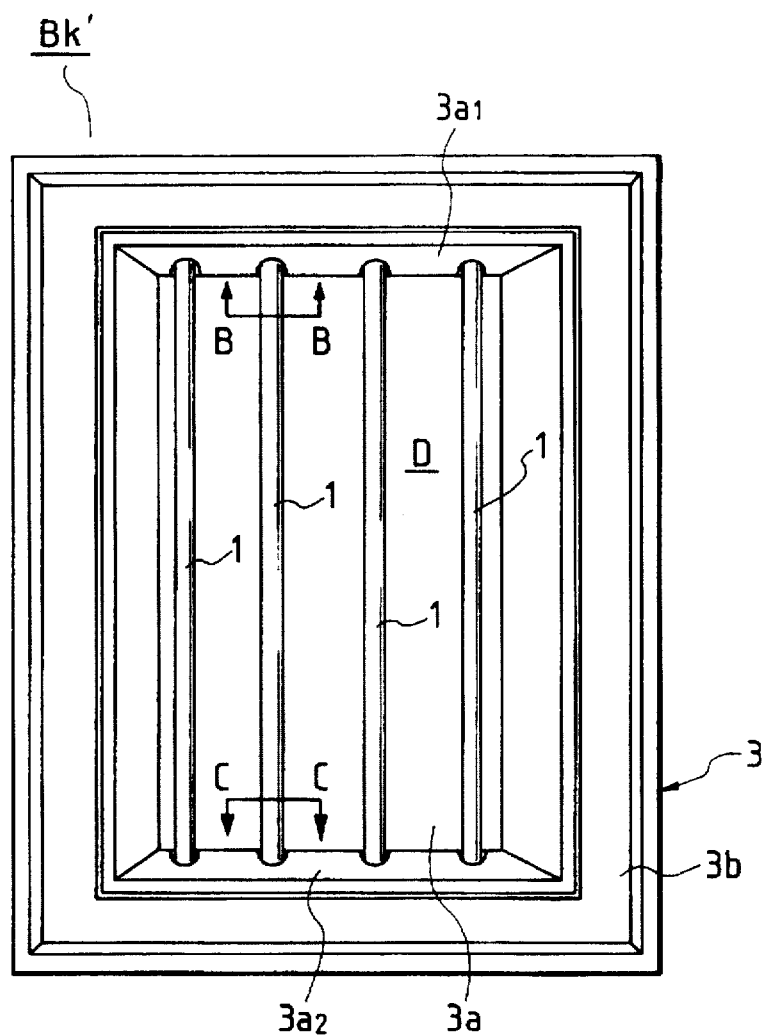
FIGS. 1A, 1B and 1C are respectively a schematic plan view, a cross-sectional view along a line B—B in FIG. 1A and a cross-sectional view along a line C—C in FIG. 1A, showing the structure of a rear light source device.
Figure 1B:
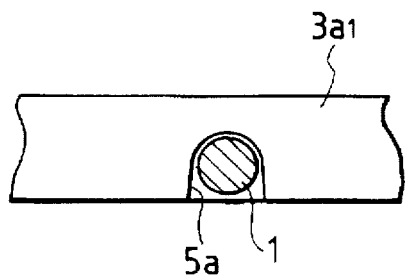
Figure 1C:
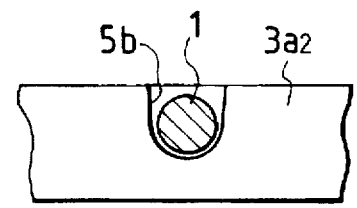
Figure 2A:
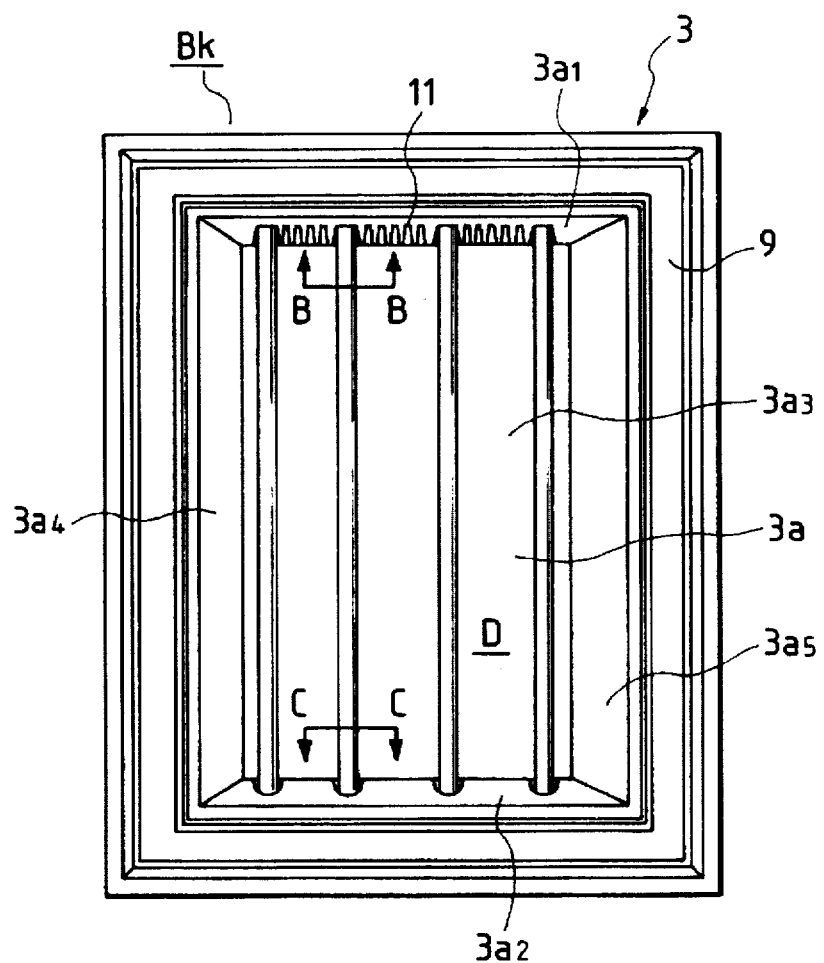
FIGS. 2A, 2B and 2C are respectively a schematic plan view, a cross-sectional view along a line B—B in FIG. 2A and a cross-sectional view along a line C—C in FIG. 2A, showing the structure of a 1st embodiment of the rear light source device of the present invention.
Figure 2B:
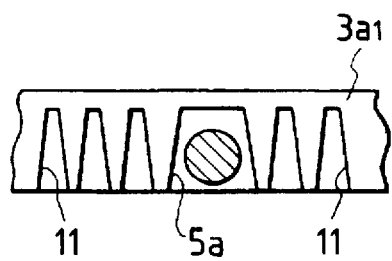
Figure 2C:
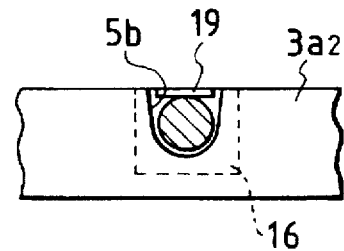

FIG. 2A is a schematic plan view of an embodiment of the rear light source device of the present invention, while FIGS. 2B and 2C illustrate respectively an upper part and a lower part of said rear light source device.

The rear light source device (Bk) having a lamp chamber D in which straight-tube light source lamps 1 are arranged in the vertical direction is provided, as shown in FIGS. 2A, 2B and 2C, with ventilation holes 11 formed on an upper lateral face $3a_1$ of said lamp chamber D for releasing the air of said lamp chamber D, heated by the light source lamps 1, to the exterior, and seal members 16 mounted on a lower lateral face $3a_2$ of said lamp chamber D and substantially closing the gap between said light source lamps 1 and notches 5b for inserting said lamps 1, thereby intercepting the external air.

In the above-explained structure, the lamp chamber D may be constructed in a vertically oblong manner.

Said rear light source device Bk may also be mounted on a liquid crystal display panel.

Figure 3A:
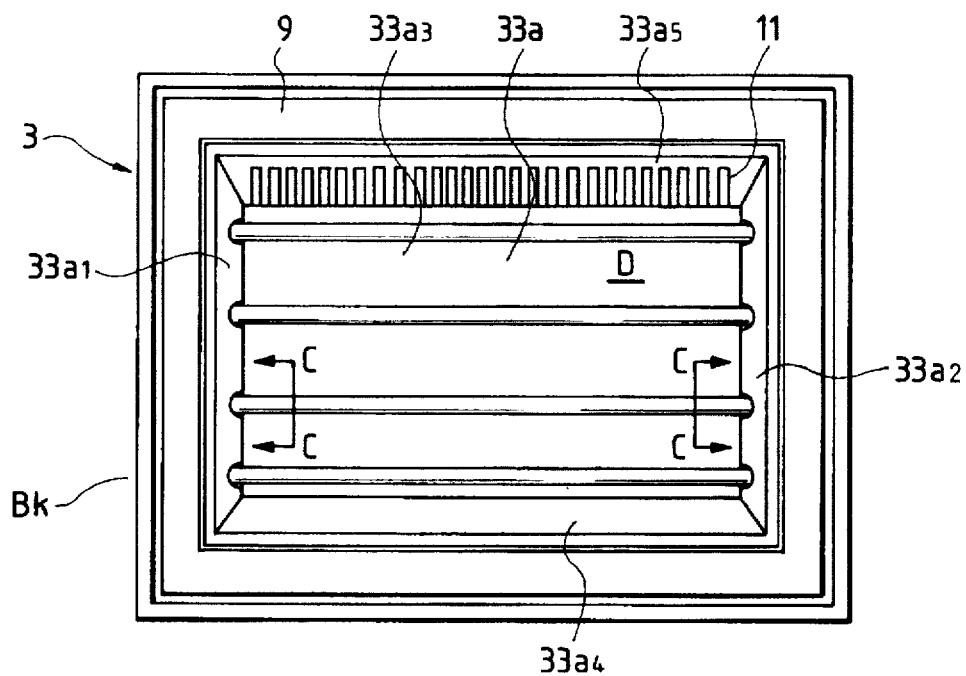
FIGS. 3A and 3B are respectively a plan view and a cross-sectional view along a line C—C in FIG. 3A, showing the structure of a 2nd embodiment of the rear light source device of the present invention.
Figure 3B:
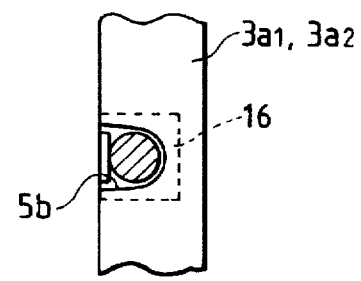

FIG. 3A is a schematic plan view of another embodiment of the rear light source device of the present invention, and FIG. 3B is a partial lateral view thereof.

The rear light source device Bk shown in FIGS. 3A and 3B, having a lamp chamber D in which straight-tube light source lamps 1 are arranged in a lateral direction, is provided with ventilation holes 11 formed on an upper lateral face $33a_5$ of said lamp chamber D, for releasing the air of said lamp chamber, heated by said light source lamps 1 to the exterior.

In the above-explained configuration, said lamp chamber D may be constructed in a laterally oblong manner.

Said rear light source device Bk may also be mounted on a liquid crystal display panel 20.

In the above-explained configuration, when the liquid crystal display device is used, the light source lamps 1 of the rear light source device Bk are turned on. Said light source lamps generates heat as well as light, and the air in said lamp chamber D, heated by said generated heat, flows upwards and is released to the exterior through the ventilation holes 11 formed on the upper lateral face $3a_1$ of the lamp chamber D. On the other hand, at the lower lateral face $3a_2$ of the lamp chamber D, the notches 5b for lamp insertion are substantially closed by the seal members 16. Consequently, in the upper part of the lamp chamber D, the temperature increase is suppressed by the release of the heated air to the exterior through the ventilation holes 11, while, in the lower part, the entry of the cold external air is intercepted, whereby the temperature distribution in the entire lamp chamber D is improved.

Also the interception of the entry of the external air into the lamp chamber D by the seal members 16 also eliminates the dust sucked together with said air, thus preventing the dust deposition for example onto the reflector.

The numbers and symbols attached to the components in the foregoing description are simply given for the purpose of reference to the attached drawings, but do not limit, in any way, the configuration of the present invention.

The lamp (light source) to be employed in the present invention is suitably selected according to the image to be displayed, but can be composed, in specific examples, of a light source emitting the light of a broad spectrum such as a halogen lamp or a tungsten lamp, or a light source emitting the light having three spectral peaks of a narrow half-value width respectively corresponding to red, green and blue spectral regions, such as a three-wavelength fluorescent lamp.

A cover for the lamp chamber is desirably composed of a transparent member, but is preferably subjected to non-glare treatment by forming minute surface irregularities, in order to obtain uniform planar illuminating light.

Also in order to prevent formation of a temperature distribution depending on the shape of the lamp chamber, a heat conducting member such as of a metal is preferably provided around the lamp chamber, thereby rendering the temperature of the peripheral walls uniform.

In the following there will be explained embodiments of the present invention, with reference to the attached drawings.

[1st Embodiment]

At first there will be explained a 1st embodiment, with reference to FIGS. 2A, 2B, 2C, and 4 to 11.

A liquid crystal display device includes a liquid crystal display panel and a rear light source device. The liquid crystal panel utilizes a chiral smectic liquid crystal phase SmC* of the surface stabilized ferroelectric liquid crystal (SSFLC) mode, and the rear light source device is the direct illumination type, in which the light source is positioned behind the liquid crystal display panel.

The rear light source device Bk is provided with a frame member 3 composed of a white plastic material of predetermined reflective characteristics and provided with a reflector portion 3a and a mounting portion 3b as shown in FIG. 2A. Said reflector portion 3a is composed of a bottom face $3a_3$, steeply inclined upper and lower lateral faces $3a_1$, $3a_2$ and mildly inclined right and left lateral faces $3a_4$, $3a_5$ thereby constituting a vertically oblong rectangular recess.

Figure 4:
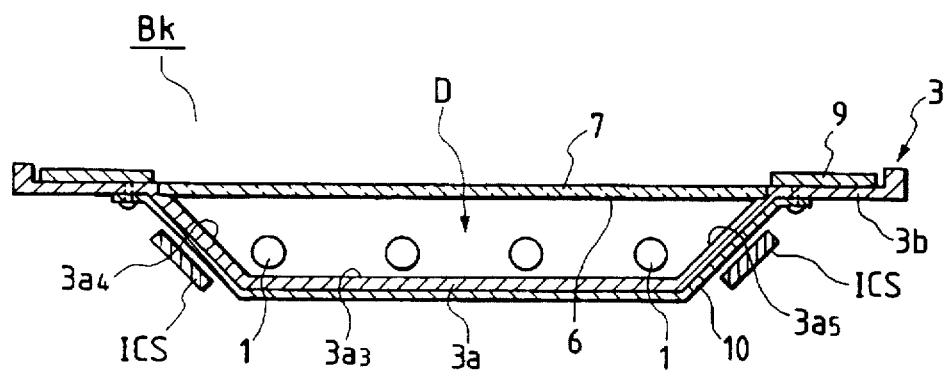
FIG. 4 is a cross-sectional view showing the structure of the 1st embodiment of the rear light source device of the present invention.

FIG. 4 shows the cross section of the device shown in FIG. 2A.

Said frame member 3 is provided, as shown in FIG. 4, with a cover consisting of a lighting curtain 6 and a diffusing plate 7 laminated thereto, whereby a lamp chamber D containing the fluorescent lamps 1 is defined. Said lighting curtain 6 and diffusing plate 7 function as light regulating means, thereby providing substantially uniform planar illuminating light.

On a mounting face side of the mounting portion 3b, there is mounted a temperature averaging plate 9 composed of a metal of a high thermal conductivity, such as an aluminum plate, fixed over substantially the entire surface. Also on the rear face of the reflector portion 3a, there is mounted a temperature averaging plate 10. A driving IC substrate ICS is mounted behind said temperature averaging plate 10.

In said lamp chamber D, four small straight-tube fluorescent lamps 1 are provided vertically, namely along the longitudinal direction of the lamp chamber D, in mutually parallel manner, and said fluorescent lamps extend, at the end electrode portions thereof, penetrating through the upper and lower lateral faces $3a_1$, $3a_2$ as shown in FIGS. 2B and 2C. Said upper lateral face $3a_1$ of the reflector portion is provided, as detailedly shown in FIG. 2B, with relatively large trapezoidal notches 5a for accepting the fluorescent lamps 1, and a plurality of ventilation holes 11 for heat dissipation, over the substantially entire width. Said ventilation holes 11 need not necessarily be of the illustrated long trapezoidal shape but can be of any other shape such as rectangular or circular. In short, said ventilation holes need only to constitute a ventilation area, capable of easily diffusing the air heated by the lamps 1 to the exterior, over the substantially entire area of the upper lateral face $3a_1$.

Figure 5:
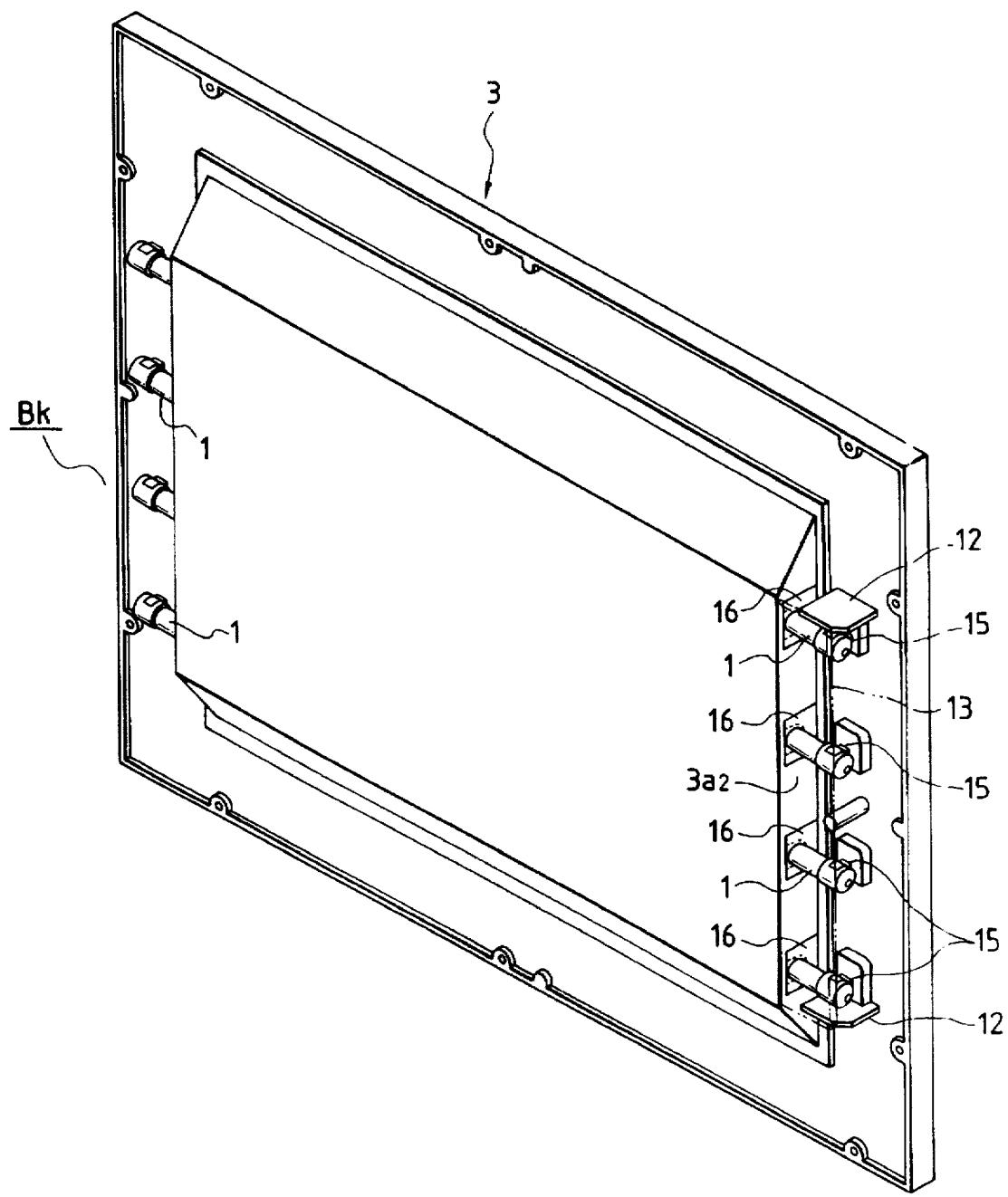
FIG. 5 is a rear perspective view showing the structure of the 1st embodiment of the rear light source device of the present invention.
Figure 6:
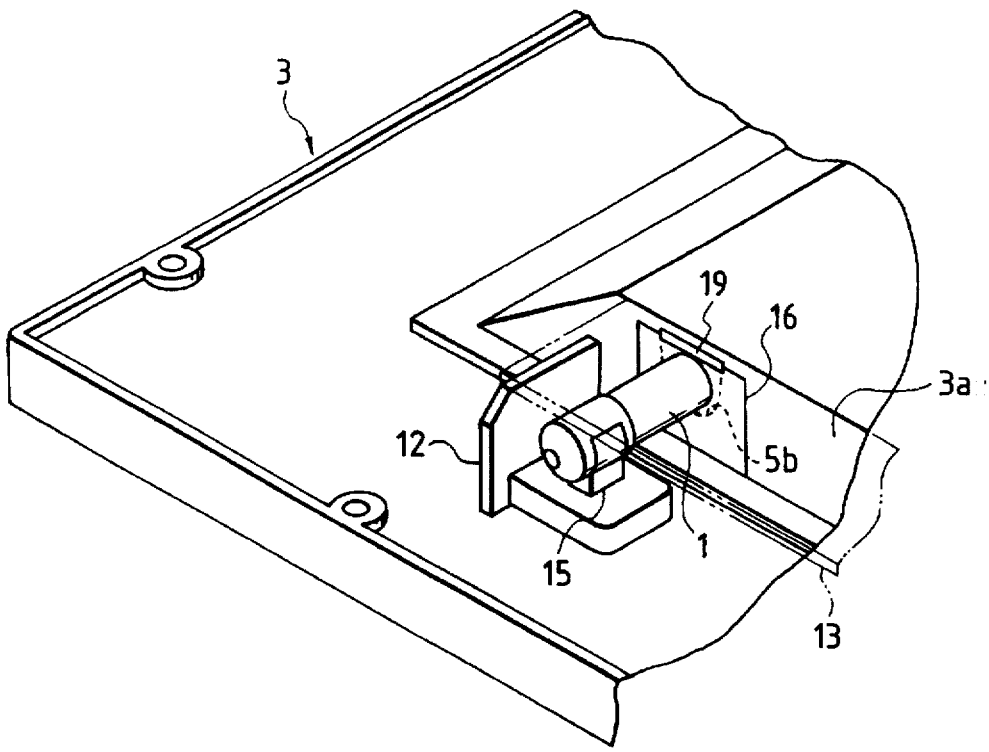
FIG. 6 is a perspective view showing the mounting structure for fluorescent lamps.
Figure 7:
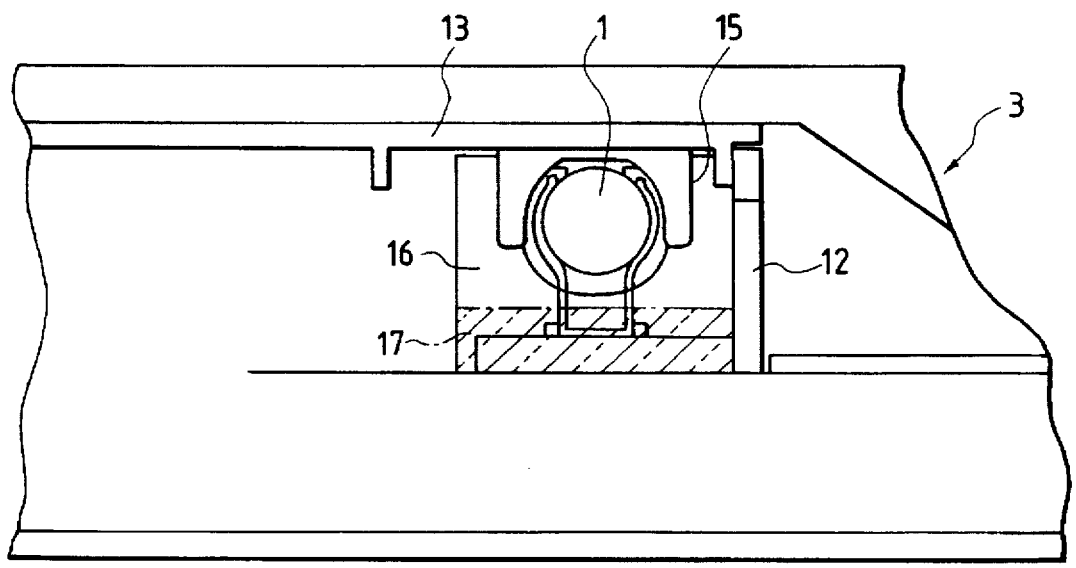
FIG. 7 is a cross-sectional view showing the mounting structure for a fluorescent lamp and other structures.

On the other hand, as detailedly shown in FIG. 2C, the lower lateral face $3a_2$ of the reflector portion is provided with U-shaped notches 5b for accepting the fluorescent lamps 1, and the end portions of said lamps extend to the exterior through said notches 5b. In the mounting portion 3b positioned outside said lower lateral face $3a_2$, there are fixed, as shown in FIGS. 5, 6 and 7, electrode covers 13 for covering the electrode portions of said fluorescent lamps, utilizing side walls 12. Also on said mounting portion 3b of the frame member 3, there are fixed sockets 15 (cf. FIG. 7) for mounting the fluorescent lamps 1. Consequently the fluorescent lamps 1 are supported between said sockets 15, and, at the end electrode portions, there are connected cords leading to an unrepresented power source.

Figure 8A:
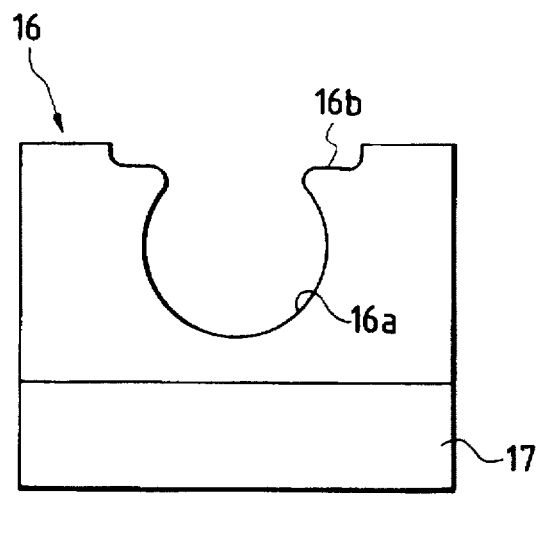
FIGS. 8A and 8B are respectively a plan view and a lateral view of a seal member.
Figure 8B:
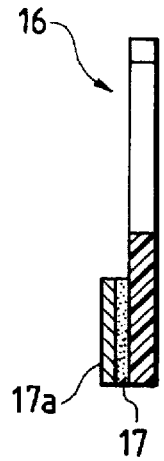

Outside the notches 5b of the lower lateral face $3a_2$ of the reflector portion, there are mounted seal members 16. As shown in FIGS. 8A and 8B, said seal member 16 is composed of a thin flexible plate, bearing, on a face thereof, an adhesive tape 17 with a peelable piece 17a. Said seal member 16 is provided with a substantially circular notch 16a matching the external diameter of the small fluorescent lamp 1, and said notch 16a continues to a substantially rectangular oblong notch 16b formed on a side.

After said peelable piece 17a is peeled off, said seal member 16 is adhered, by means of the adhesive tape 17, to the outer surface of the lower lateral face $3a_2$ as shown in FIGS. 6 and 7, and said circular notch 16a intimately contacts the fluorescent lamp 1 to prevent the inhalation of air and dust from the notches 5b formed on the lower lateral face $3a_2$. Said rectangular notch 16b is provided for avoiding interference with an unrepresented part of the electrode cover, thereby facilitating the adhesion of the seal member 16, and, for securing the sealing of the external air expected as an effect of the present invention, the seal member may only be provided with the circular notch 16a matching the external form of the fluorescent lamp 1.

Figure 9:
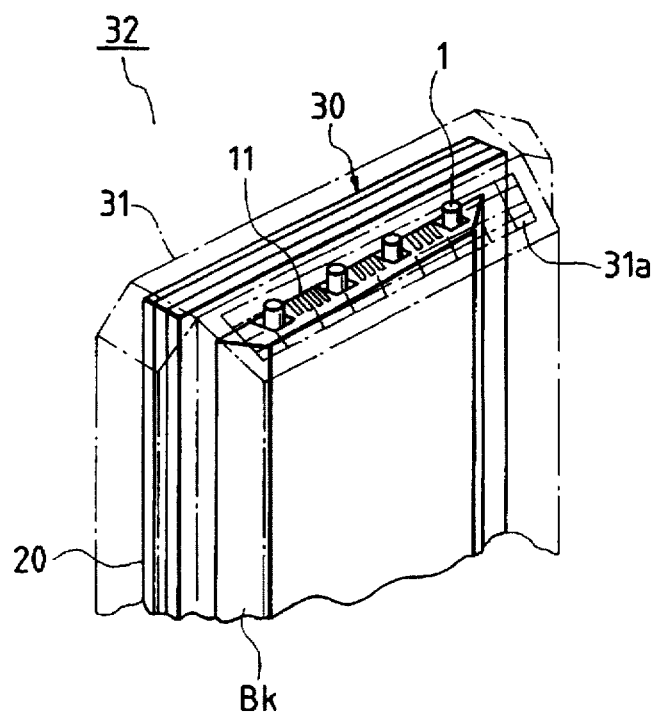
FIG. 9 is a perspective view showing the structure of a liquid crystal display device.

The above-explained rear light source device Bk is integrally combined with a liquid crystal display panel 20 to be explained in the following to constitute a main body 30, which is incorporated in a cover 31 as shown in FIG. 9 to constitute a liquid crystal display device 32. Said cover 31 is provided with grating-shaped heat radiation holes 31a in positions corresponding to those of the ventilation holes 11 formed in the upper lateral face $3a_1$ of said reflector portion, in order that the heated air in the lamp chamber D escapes to the exterior through said ventilation holes 11 and the heat radiation holes 31a.

In the following there will be given an explanation on the liquid crystal panel 20, with reference to FIGS. 10 and 11. Said liquid crystal panel 20 is mounted on the mounting portion 3b of said frame member 3 in the rear light source device Bk, across a temperature averaging plate 9.

Figure 10:
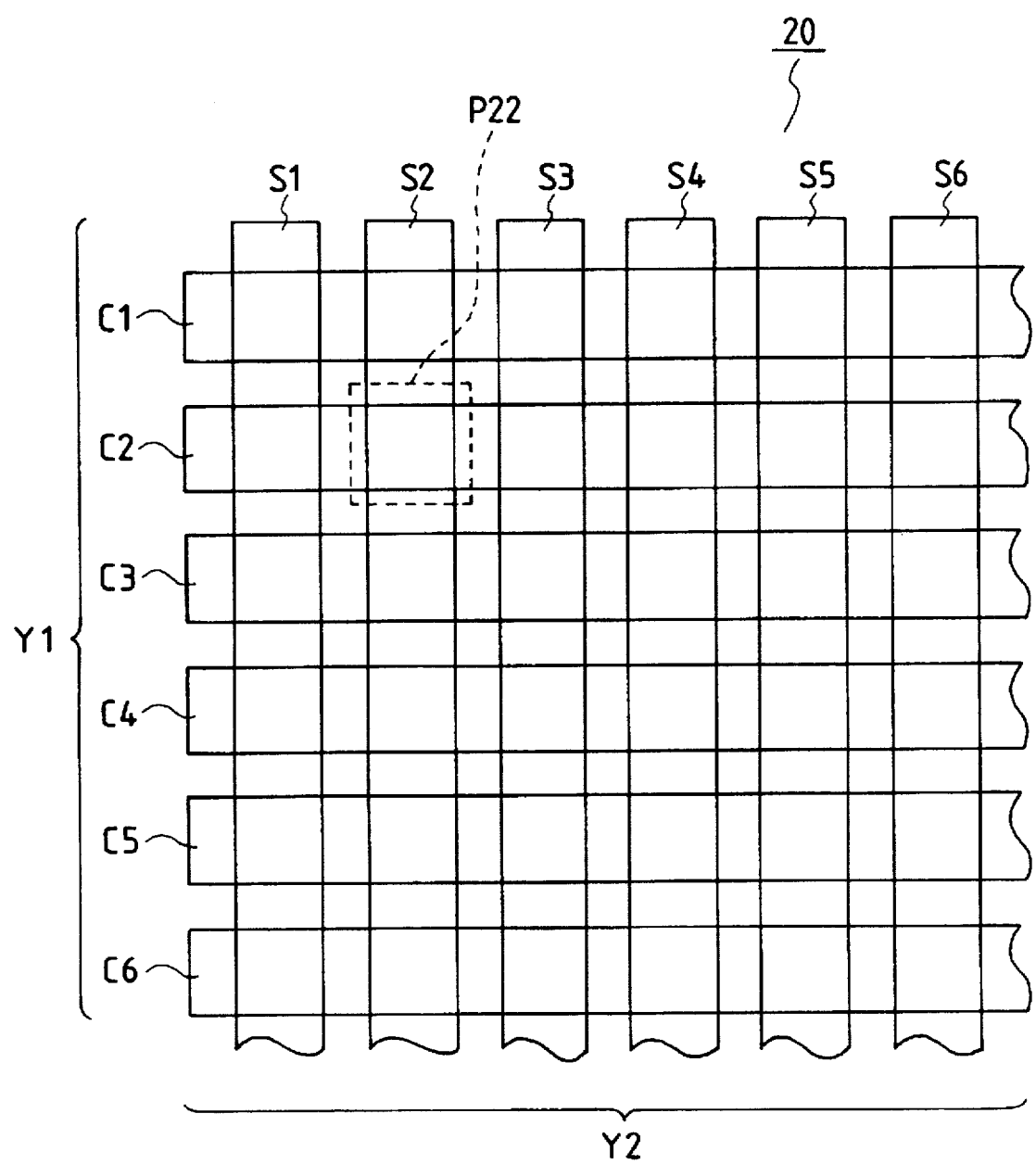
FIG. 10 is a view showing scanning electrodes and information electrodes of a liquid crystal display panel.
Figure 11:
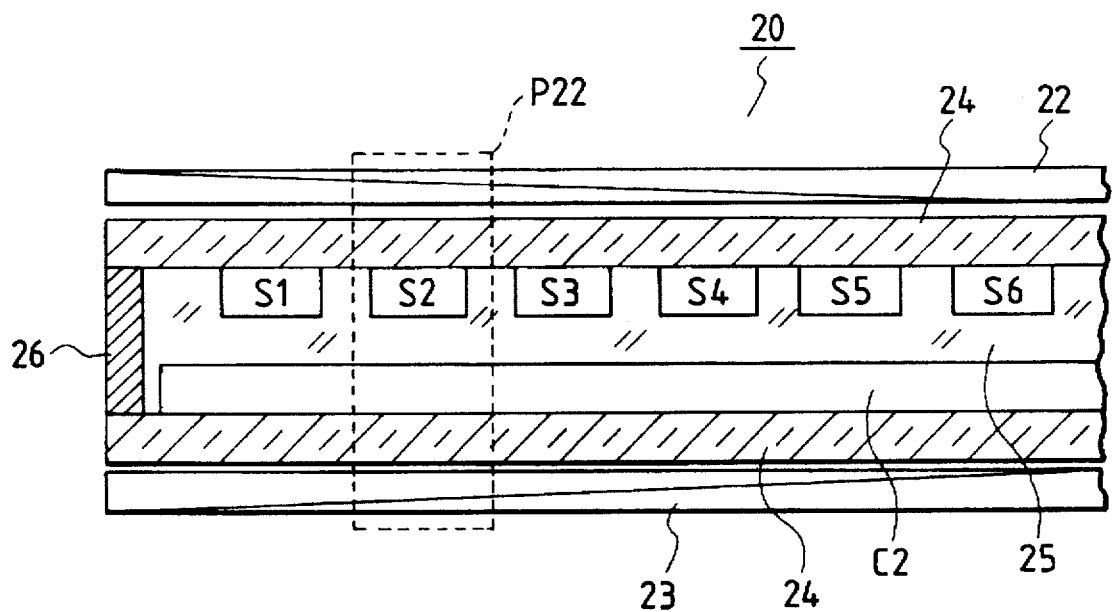
FIG. 11 is a cross-sectional view showing the structure of a liquid crystal display panel.
Figure 12:
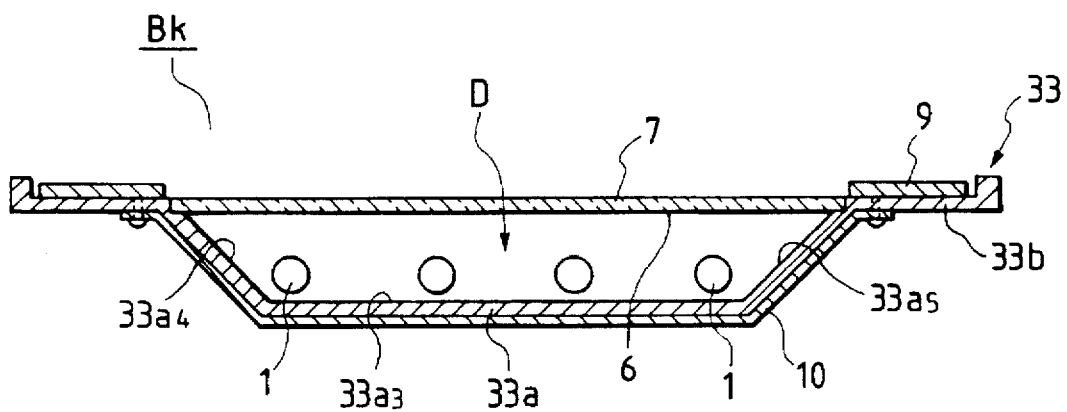
FIG. 12 is a cross-sectional view showing the structure of a 2nd embodiment of the rear light source device of the present invention.
Figure 13:
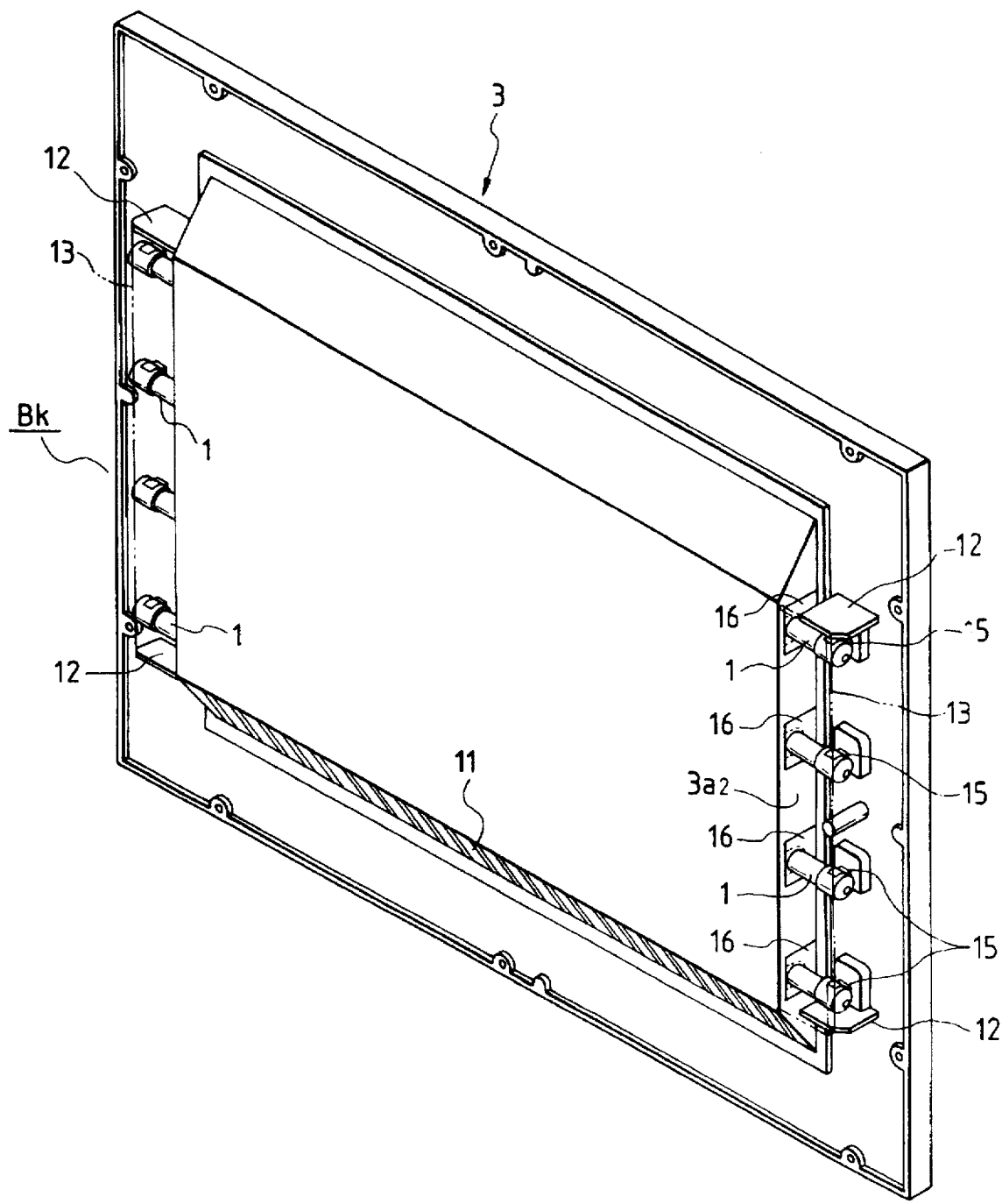
FIG. 13 is a rear perspective view showing the structure of the 2nd embodiment of the rear light source device of the present invention.

In FIG. 10 there are shown scanning electrodes C1 to C6 (Y1) and information electrodes S1 to S6 (Y2) which are so arranged to constitute a matrix. There is also shown a pixel P22 constituting the unit of display. FIG. 11 is a cross-sectional view in a plane containing the scanning electrode C2, wherein shown are an analyzer 22 and a polarizer 23, which are arranged in a mutually orthogonal relationship. There are further shown glass substrates 24, liquid crystal 25 for example in a nematic, cholesteric or smectic phase, and a seal member 26.

The above-mentioned scanning electrodes Y1 and information electrodes Y2 are covered with an insulating layer (not shown), consisting of an inorganic insulating film of a thickness of 200 to 2000 Å for example of silicon monoxide, silicon dioxide, aluminum oxide, magnesium fluoride, cellium oxide, cesium fluoride, silicon nitride, silicon carbide, tantalum pentoxide or tungsten pentoxide. Said inorganic insulation film is further covered with an orientation control film (not shown) of a thickness of 50 to 1000 Å, consisting for example of a film of polyimide, polyvinyl alcohol or polyamide subjected to a rubbing process for generating a pre-tilt angle of 5° or larger in case of smectic liquid crystal, or a diagonally evaporated SiO film for generating a pre-tilt angle of 5° or larger. Though not illustrated, heat-generating lines are vertically provided on said liquid crystal panel 20 and are given a current, in order to maintain the liquid crystal within a predetermined temperature range.

In the use of the liquid crystal display device 32, a power switch is turned on to energize the fluorescent lamps 1 of the rear light source device Bk, whereby said fluorescent lamps emit light, which is reflected by the reflector portion 3a, then made uniform by the lighting curtain 6 and diffused by the diffusing plate 7, thereby uniformly illuminating the rear face of the liquid crystal panel 20. In this state information is written into predetermined pixels of the ferroelectric liquid crystal 25 by signals given by the scanning electrodes Y1 and the information electrodes Y2, whereby said liquid crystal functions as an optical switch to transmit or intercept the light from said rear light source device Bk. In this manner the predetermined image is displayed on the liquid crystal panel 20.

In this operation the fluorescent lamps 1 generate heat as well as light, and the air in the lamp chamber D is heated by thus generated heat and is guided upwards to the upper part of the lamp chamber D through paths between the vertically arranged fluorescent lamps 1. Since the upper lateral face $3a_1$ of the lamp chamber D is provided, over the substantially entire area thereof, with a plurality of ventilating holes 11, said heated air is released therethrough to the exterior, and the external cold air is introduced also through said holes 11. Consequently the air in the upper part of the lamp chamber D does not exceed a certain temperature.

On the other hand, the above-mentioned upward air flow in the upper part of the lamp chamber D induces air inhalation from the U-shaped notches $5b$, formed on the lower lateral face $3a_2$ of the lamp chamber D thereinto, but the external air entry through said notches $5b$ is intercepted since they are substantially closed by the seal members 16. The lower portion of the lamp chamber D, being almost free from the introduction of cold air, does not show apparent temperature decrease, whereby the temperature distribution over the entire area of the lamp chamber D, including the upper and lower portions thereof, is reduced in combination with the above-mentioned prevention of temperature increase in the upper part of the lamp chamber. More specifically, in combination with the heat averaging and heat radiating effects of said heat averaging plates 9, 10, the temperature increase is suppressed to a range of 0° to 15° C., or the temperature distribution is retained within a range of 0° to 7° C.

Also the above-mentioned interception of the external air entry into the lamp chamber D through the notches $5b$ prevents the suction of dust together with the external air into the lamp chamber D, whereby the dust deposition onto the reflector portion $3a$ can be prevented. As a result it is rendered possible to prevent the deterioration or unevenness in the reflective characteristics resulting from such dust deposition, and to prevent formation of unevenness in the luminosity.

The foregoing embodiment has been limited to a display device including a liquid crystal panel utilizing the surface stabilized ferroelectric liquid crystal, but the present invention is not limited to such an embodiment and is likewise applicable to other display devices for example of nematic liquid crystal, such as a TFT liquid crystal display device employing micro color filters. Also the lamp chamber D is assumed to be vertically oblong, but the present invention is likewise applicable to a square or horizontally oblong lamp chamber as long as the fluorescent lamps 1 are vertically positioned.

[2nd Embodiment]

In the following there will be explained a 2nd embodiment of the present invention, with reference to FIGS. 3A, 3B, 12 and 13.

In contrast to the foregoing first embodiment in which the rear light source device Bk is vertically oblong, that in the present embodiment is shaped laterally oblong. Also, because of said difference in shape, the fluorescent lamps 1 are provided horizontally instead of vertically. Furthermore, in the present embodiment, the U-shaped notches $5b$ for inserting the fluorescent lamps are formed on the left and right lateral faces $33a_1$, $33a_2$ of the frame member 33 and are closed, as in the foregoing embodiment, by seal members 16 for intercepting the external air entry. Furthermore, the ventilating holes 11 for heat dissipation are formed on the upper lateral face $33a_5$ of the frame member 33. In the following there will be given a more detailed explanation.

In the present embodiment, the rear light source device Bk includes, as shown in FIG. 3A, a frame member 33 composed of a white plastic material of predetermined reflective characteristics and provided with a reflector portion $33a$ and a mounting portion $33b$, wherein said reflector portion $33a$ is provided with a bottom face $33a_3$, steeply inclined left and right lateral faces $33a_1$, $33a_2$, and mildly inclined upper and lower lateral faces $33a_4$, $33a_5$ thereby constituting a laterally oblong rectangular recess.

Other structures are essentially the same as those of the first embodiment. The frame member 33 is provided with a cover, for covering said recess, consisting of a lighting curtain 6 and a diffusing plate 7 laminated therewith, thereby constituting a lamp chamber D incorporating fluorescent lamps 1 (cf. FIG. 12). On the mounting surface of the mounting portion $33b$, there is fixed a temperature averaging plate 9, composed of a metal of a high thermal conductivity, such as an aluminum plate, over the entire periphery. Also on the rear face of the reflector portion $33a$, there is fixed a temperature averaging plate 10, behind which is mounted a driving IC substrate (not shown).

In said lamp chamber D, four small straight-tube fluorescent lamps 1 are provided in the lateral direction, namely along the longitudinal direction of the lamp chamber D, in mutually parallel manner, and the end electrode portions of said fluorescent lamps 1 extend, as detailedly shown in FIG. 3C, to the exterior through the left and right lateral faces $33a_1$, $33a_2$. Also the upper lateral face $33a_5$ of the reflector portion is provided, as shown in FIG. 3A, with a plurality of ventilation holes 11 over substantially the entire width thereof. Said ventilation holes 11 need not necessarily be of the illustrated rectangular shape but can be of any other shape such as oblong trapezoidal or circular, and said ventilation holes 11 need only to constitute a ventilating part, capable of easily releasing the air heating by the lamps 1 to the exterior through the substantially entire area of the upper lateral face $33a_5$.

Also as detailedly shown in FIG. 3C, the left and right lateral faces $33a_1$, $33a_2$ of the reflector portion are provided with U-shaped notches $5b$ for inserting the fluorescent lamps, and the end portions thereof protrude to the exterior through said notches $5b$. As in the foregoing 1st embodiment, on the end portions of the fluorescent lamps 1, there are mounted electrode covers 13, sockets 15 and seal members 16.

More specifically, the electrode covers 13 are fixed on mounting portions $33b$ positioned at the outside of the left and right lateral faces $33a_1$, $33a_2$, utilizing side walls 12, and cover the electrode portions of the fluorescent lamps 1. On said mounting portions $33b$ there are fixed sockets 15 (cf. FIG. 7) by which the fluorescent lamps 1 are supported. Said sockets 15 are further provided with power supply cords (not shown). Also on the outside of the notches $5b$ of the left and right lateral faces $33a_1$, $33a_2$, there are mounted the seal members 16. As shown in FIGS. 8A and 8B, said seal member 16 is composed of a thin flexible plastic plate, having, on a face thereof, an adhesive tape 17 bearing a peelable piece $17a$. Said seal member 16 is further provided with a substantially circular notch $16a$ matching the external diameter of the small fluorescent lamp 1, and said circular notch $16a$ continues to a substantially rectangular oblong notch $16b$ formed on a side. After said peelable piece $17a$ is peeled off, the seal member 16 is adhered, by said adhesive tape 17, to the outside of the left and right lateral faces $33a_1$, $33a_2$ as shown in FIGS. 6 and 7, and the circular notch $16a$ closely contacts the fluorescent lamp 1 thereby preventing inhalation of air and dust from the lamp inserting notches $5b$ formed on the left and right lateral faces $33a_1$, $33a_2$. Said rectangular notch $16b$ is formed for preventing interference with a part (not shown) of the electrode cover and facilitating the adhesion of the seal member 16, and, in order to secure the interception of the external air expected as an effect of the present invention, the seal member is provided only with the circular notch $16a$ matching the external shape of the fluorescent lamp 1.

In the following there will be explained the function of the 2nd embodiment explained above.

In the use of the liquid crystal display device 32, a power switch is turned on to energize the fluorescent lamps 1 of the rear light source device Bk, whereby the lamps 1 emit light which is reflected by the reflector portion 3, then made uniform by the lighting curtain 6 and diffused by the diffusing plate 7 to uniformly illuminate the rear face of the liquid crystal panel 20. In this state information is written into certain pixels of the ferroelectric liquid crystal 25 by the signals supplied to the scanning electrodes Y1 and the information electrodes Y2, whereby said liquid crystal functions as an optical switch and transmits or intercepts the light from said rear light source device Bk. In this manner an image is displayed on the liquid crystal panel 20.

In this state the air in the lamp chamber D is heated by the fluorescent lamps 1 and moves upwards in said lamp chamber D. Since the upper lateral face $33a_5$ in the present embodiment, positioned in the upper part of the lamp chamber D, is provided, over substantially the entire area thereof, with a plurality of the ventilating holes 11, said heated air is released therethrough to the exterior and the external cold air is introduced through said holes 11, whereby the air in the upper portion of the lamp chamber D is not heated beyond a certain temperature.

On the other hand, such air flow through the ventilating holes 11 to the exterior tends to induce air inhalation into the lamp chamber D through the lamp inserting U-shaped notches $5b$ formed on the left and right lateral faces $33a_1$, $33a_2$ of the lamp chamber D, but such external air entry is intercepted since said notches $5b$ are substantially closed by the seal members 16. Consequently there is prevented the temperature decrease in the lower portion of the lamp chamber D by the accumulation of a large amount of cold air therein, whereby the temperature distribution over the entire lamp chamber D, including the upper and lower portions thereof, is reduced, in combination with the above-mentioned suppression of temperature increase in the upper portion of the lamp chamber D.

Also the above-mentioned interception of external air entry into the lamp chamber D through the notches $5b$ prevents the inhalation, into the lamp chamber D, of dust together with the external air, whereby prevented is the deposition of dust onto the reflector portion $3a$. It is therefore rendered possible to prevent the deterioration or unevenness in the reflective characteristics resulting from such dust deposition, and to prevent formation of unevenness in the luminosity.

As explained in the foregoing, the present invention realizes a uniform temperature distribution in the lamp chamber of the rear light source device, thereby preventing the errors in the function of the liquid crystal display device, thus to improve the reliability thereof, and enabling a wider driving margin for the liquid crystal panel, thus to improve the image quality.

Also the present invention reduces the entry of dust into the lamp chamber, thereby reducing the deposition of dust on the reflector and preventing formation of unevenness in the luminosity of the liquid crystal display device, resulting from such dust deposition.

Particularly in a rear light source device having a vertically oblong lamp chamber, which tends to generate a significant temperature difference in the vertical direction, the present invention can effectively suppress the formation of such temperature difference, based on the combined effect of the heated air release in the upper portion of said lamp chamber and the interception of the external air entry in the lower portion of said lamp chamber.

What is claimed is:

1. A light source device comprising:
    a lamp chamber having a rear wall, a pair of side walls, an upper wall and a lower wall;
    a light source arranged in said chamber;
    a ventilating hole formed in said upper wall;
    a light transmitting cover provided at a front of said lamp chamber for closing said chamber;
    a through hole formed in at least one of said upper wall and said lower wall so that said light source penetrates into the through hole; and
    a sealing member disposed proximate to the through hole for reducing a gap between the through hole and said light source, wherein said sealing member is a thin flexible plate having a notch.

2. A device according to claim 1, wherein said light transmitting cover is a diffusion plate.

3. A device according to claim 1, wherein a seating member is added to the through hole for reducing a gap between the through hole and said light source.

4. A device according to claim 1, wherein said light source includes a straight tube and has an illuminated portion and a non-illuminated portion.

5. A device according to claim 4, wherein said illuminated portion of said light source is positioned in an interior of said lamp chamber and said non-illuminated portion is positioned outside of said lamp chamber.

6. A device according to claim 1, further comprising a thermally averaging plate surrounding a periphery of a face of said chamber.

7. A device according to claim 1, further comprising a thermally averaging plate provided at a back side plane of said chamber.

8. A light source device comprising:
    a lamp chamber having a rear wall, a pair of side walls, an upper wall and a lower wall;
    a light source arranged in said chamber;
    a light transmitting cover provided at a front of said lamp chamber for closing said chamber; and
    a plurality of ventilating holes formed at said upper wall, and through holes formed in said upper and lower walls so that said light source penetrates into the through hole.

9. A device according to claim 8, wherein said light transmitting cover is a diffusion plate.

10. A device according to claim 8, wherein a sealing member is added to the through hole for reducing a gap between the through hole and said light source.

11. A device according to claim 8, wherein said light source includes a straight tube and has an illuminated portion and a non-illuminated portion.

12. A device according to claim 11, wherein said illuminated portion of said light source is positioned in an interior of said lamp chamber and said non-illuminated portion is positioned outside of said lamp chamber.

13. A device according to claim 8, further comprising a thermally averaging plate surrounding a periphery of a face of said chamber.

14. A device according to claim 8, further comprising a thermally averaging plate provided at a back side plane of said chamber.

15. A light source device comprising:
   a lamp chamber having a rear wall, a pair of side walls, an upper wall and a lower wall;
   a light source arranged in said chamber;
   a ventilating hole formed in said upper wall;
   a light transmitting cover provided at a front of said lamp chamber for closing said chamber;
   a through hole formed in at least one of said side walls so that said light source penetrates into the through hole; and
   a sealing member disposed proximate to the through hole for reducing a gap between the through hole and said light source, wherein said sealing member is a thin flexible plate having a notch.

16. A device according to claim 15, wherein said light transmitting cover is a diffusion plate.

17. A device according to claim 15, wherein said light source includes a straight tube and has an illuminated portion and a non-illuminated portion.

18. A device according to claim 17, wherein said illuminated portion of said light source is positioned in an interior of said lamp chamber and said non-illuminated portion is positioned outside of said lamp chamber.

19. A device according to claim 15, further comprising a thermally averaging plate surrounding a periphery of a face of said chamber.

20. A device according to claim 15, further comprising a thermally averaging plate provided at a back side plane of said chamber.

21. A rear light source device comprising:
   a lamp chamber having a rear wall, a pair of side walls, an upper wall and a lower wall;
   a light source arranged in said chamber;
   a ventilating hole formed in said upper wall;
   a light transmitting cover provided at a front of said lamp chamber for closing said chamber, with said light transmitting cover being a diffusion plate and including a lighting curtain; and
   a through hole formed in at least one of said side wall, said upper wall and said lower wall, so that said light source penetrates into the through hole.

22. A device according to claim 21, wherein a sealing member is added to the through hole for reducing a gap between the through hole and said light source.

23. A device according to claim 21, wherein said light source includes a straight tube and has an illuminated portion and a non-illuminated portion.

24. A device according to claim 23, wherein said illuminated portion of said light source is positioned in an interior of said lamp chamber and said non-illuminated portion is positioned outside of said lamp chamber.

25. A device according to claim 21, further comprising a thermally averaging plate surrounding a periphery of a face of said chamber.

26. A device according to claim 21, further comprising a thermally averaging plate provided at a back side plane of said chamber.

27. A liquid crystal apparatus comprising:
   a light source device including a lamp chamber having a rear wall, a pair of side walls, an upper wall and a lower wall;
   a light source arranged in said chamber;
   a ventilating hole formed in said upper wall;
   a light transmitting cover provided at a front of said lamp chamber for closing said chamber;
   a through hole formed in at least one of said upper wall and said lower wall so that said light source penetrates into the through hole;
   a liquid crystal panel arranged at a front of said light transmitting cover; and
   a sealing member disposed proximate to the through hole for reducing a gap between the through hole and said light source, wherein said sealing member is a thin flexible plate having a notch.

28. A device according to claim 27, wherein said light transmitting cover is a diffusion plate.

29. A device according to claim 27, wherein a seating member is added to the through hole for reducing a gap between the through hole and said light source.

30. A device according to claim 27, wherein said light source includes a straight tube and has an illuminated portion and a non-illuminated portion.

31. A device according to claim 30, wherein said illuminated portion of said light source is positioned in an interior of said lamp chamber and said non-illuminated portion is positioned outside of said lamp chamber.

32. A device according to claim 27, further comprising a thermally averaging plate surrounding a periphery of a face of said chamber.

33. A device according to claim 27, further comprising a thermally averaging plate provided at a back side plane of said chamber.

34. A liquid crystal apparatus comprising:
   a light source device including a lamp chamber having a rear wall, a pair of side walls, an upper wall and a lower wall;
   a light source arranged in said chamber;
   a light transmitting cover provided at a front of said lamp chamber for closing said chamber;
   a liquid crystal panel arranged at a front of said light transmitting cover; and
   a plurality of ventilating holes formed at said upper wall, and through holes formed in said upper and lower walls so that said light source penetrates into the through holes.

35. A device according to claim 34, wherein said light transmitting cover is a diffusion plate.

36. A device according to claim 34, wherein a sealing member is added to the through hole for reducing a gap between the through hole and said light source.

37. A device according to claim 34, wherein said light source includes a straight tube and has an illuminated portion and a non-illuminated portion.

38. A device according to claim 37, wherein said illuminated portion of said light source is positioned in an interior of said lamp chamber and said non-illuminated portion is positioned outside of said lamp chamber.

39. A device according to claim 34, further comprising a thermally averaging plate surrounding a periphery of a face of said chamber.

40. A device according to claim 34, further comprising a thermally averaging plate provided at a back side plane of said chamber.

41. A liquid crystal apparatus comprising:
   a light source device including a lamp chamber having a rear wall, a pair of side walls, an upper wall and a lower wall;

a light source arranged in said chamber;

a ventilating hole formed in said upper wall;

a light transmitting cover provided at a front of said lamp chamber for closing said chamber;

a through hole formed in at least one of said side walls so that said light source penetrates into the through hole;

a liquid crystal panel arranged at a front of said light transmitting cover; and a sealing member disposed proximate to the through hole for reducing a gap between the through hole and said light source, wherein said sealing member is a thin flexible plate having a notch.

42. A device according to claim 41, wherein said light transmitting cover is a diffusion plate.

43. A device according to claim 41, wherein said light source includes a straight tube and has an illuminated portion and a non-illuminated portion.

44. A device according to claim 43, wherein said illuminated portion of said light source is positioned in an interior of said lamp chamber and said non-illuminated portion is positioned outside of said lamp chamber.

45. A device according to claim 41, further comprising a thermally averaging plate surrounding a periphery of a face of said chamber.

46. A device according to claim 41, further comprising a thermally averaging plate provided at a back side plane of said chamber.

47. A liquid crystal apparatus comprising:

a rear light source device including a lamp chamber having a rear wall, a pair of side walls, an upper wall and a lower wall;

a light source arranged in said chamber;

a ventilating hole formed in said upper wall;

a light transmitting cover provided at a front of said lamp chamber for closing said chamber, said light transmitting cover being a diffusion plate and including a lighting curtain;

a through hole formed in at least one of said side wall, said upper wall and said lower wall, so that said light source penetrates into the through hole; and a liquid crystal panel arranged at a front of said light transmitting cover.

48. A device according to claim 47, wherein a sealing member is added to the through hole for reducing a gap between the through hole and said light source.

49. A device according to claim 47, wherein said light source includes a straight tube and has an illuminated portion and a non-illuminated portion.

50. A device according to claim 49, wherein said illuminated portion of said light source is positioned in an interior of said lamp chamber and said non-illuminated portion is positioned outside of said lamp chamber.

51. A device according to claim 47, further comprising a thermally averaging plate surrounding a periphery of a face of said chamber.

52. A device according to claim 47, further comprising a thermally averaging plate provided at a back side plane of said chamber.

* * * * *

UNITED STATES PATENT AND TRADEMARK OFFICE
CERTIFICATE OF CORRECTION

PATENT NO. : 5,726,722

DATED : March 10, 1998

INVENTOR(S) : Uehara et al.

It is certified that error appears in the above-identified patent and that said Letters Patent is hereby corrected as shown below:

```
Title page, item
[54]   TITLE: and col. 1,

Title should read --REAR LIGHT SOURCE FOR DISPLAY DEVICE--.

[56]   REFERENCES CITED:

FOREIGN PATENT DOCUMENTS, "159129     9/1984    Japan
              588175      4/1993    Japan
              5257142    10/1993    Japan"
    should read
   --59-159129   9/1984    Japan
     5-88175    4/1993    Japan
     5-257142  10/1993    Japan--.
```

Signed and Sealed this

Fifteenth Day of December, 1998

Attest:

BRUCE LEHMAN

*Attesting Officer*  *Commissioner of Patents and Trademarks*